United States Patent
Wang et al.

(10) Patent No.: US 9,519,569 B2
(45) Date of Patent: Dec. 13, 2016

(54) METHOD FOR CONSTRUCTING DATA STRUCTURES AND METHOD FOR DESCRIBING RUNNING STATES OF COMPUTER AND STATE TRANSITIONS THEREOF

(75) Inventors: Jiaxiang Wang, Beijing (CN); Lidong Qu, Beijing (CN)

(73) Assignee: Antaios (Beijing) Information Technology Co., Ltd., Beijing (CN)

( * ) Notice: Subject to any disclaimer, the term of this patent is extended or adjusted under 35 U.S.C. 154(b) by 6 days.

(21) Appl. No.: 13/814,150

(22) PCT Filed: Sep. 26, 2010

(86) PCT No.: PCT/CN2010/077309
§ 371 (c)(1),
(2), (4) Date: Feb. 4, 2013

(87) PCT Pub. No.: WO2012/037732
PCT Pub. Date: Mar. 29, 2012

(65) Prior Publication Data
US 2013/0174162 A1    Jul. 4, 2013

(51) Int. Cl.
*G06F 11/36* (2006.01)
*G06F 9/30* (2006.01)

(52) U.S. Cl.
CPC ............. *G06F 11/3636* (2013.01); *G06F 9/30* (2013.01); *G06F 11/3604* (2013.01)

(58) Field of Classification Search
CPC .............. G06F 11/3636; G06F 11/3466; G06F 11/3604; G06F 2201/865; G06F 9/30
(Continued)

(56) References Cited

U.S. PATENT DOCUMENTS 6,226,787 B1 *  5/2001  Serra ................... G06F 11/3664
                                                      714/E11.217
7,389,497 B1 *  6/2008  Edmark et al. ............... 717/130
(Continued)

FOREIGN PATENT DOCUMENTS

| CN | 1859359 A | 11/2006 |
|---|---|---|
| CN | 101216803 A | 7/2008 |
| CN | 101655782 A | 2/2010 |

OTHER PUBLICATIONS

International Search Report dated Jul. 7, 2011 from corresponding International Application No. PCT/CN2010/077309.

*Primary Examiner* — Lewis A Bullock, Jr.
*Assistant Examiner* — Jacob Dascomb
(74) *Attorney, Agent, or Firm* — Wolf, Greenfield & Sacks, P.C.

(57) ABSTRACT

A method for constructing data structures and a method for describing running states of a computer and state transitions thereof are provided. The method for constructing the data structure, which describes the execution processes of computer codes, includes: when the computer is running, constructs the data structure using the code segment wherein lies a calling instruction as a node and using the calling relationship between the code segment initiating the calling instruction and the called code segment, which are both constructed by the calling instruction, as a calling path. The data structure includes every node and the calling path between every calling and called nodes. When a certain calling instruction is executed, it is possible to describe the running state of the computer when the calling instruction is executed with the data structure consisting of all nodes and calling paths before the calling instruction by constructing the above data structure.

6 Claims, 2 Drawing Sheets

(58) Field of Classification Search
USPC .......................................................... 714/37
See application file for complete search history.

(56) References Cited

U.S. PATENT DOCUMENTS

| | | | |
|---|---|---|---|
| 2008/0134148 A1* | 6/2008 | Clark ............................ | 717/128 |
| 2008/0244531 A1* | 10/2008 | Schmelter et al. ............ | 717/128 |
| 2010/0115494 A1* | 5/2010 | Gorton, Jr. .......... | G06F 11/3466 |
| | | | 717/128 |
| 2010/0223600 A1* | 9/2010 | Shafi et al. ................... | 717/131 |
| 2011/0154300 A1* | 6/2011 | Rao et al. ..................... | 717/133 |
| 2011/0258617 A1* | 10/2011 | Park et al. .................... | 717/157 |

* cited by examiner

METHOD FOR CONSTRUCTING DATA STRUCTURES AND METHOD FOR DESCRIBING RUNNING STATES OF COMPUTER AND STATE TRANSITIONS THEREOF

CROSS REFERENCE RELATED APPLICATIONS

The present application is a Section 371 National Stage Application of International Application No. PCT/CN2010/077309, filed on Sep. 26, 2010, the entire disclosure of which is incorporated herein by reference.

FIELD OF THE DISCLOSURE

The disclosure relates to the field of computers, and in particular to a method for constructing a data structure for describing execution process of computer codes and a method for describing running state and running state transition of a computer.

BACKGROUND OF THE DISCLOSURE

Currently, a lot of manpower has been put into researches involving computer system management and computer system security, design and implementation of hardware/software systems of the computer system management are performed by directly or indirectly judging whether a certain operation of the computer is permitted. Triggering of a certain operation may be caused by a certain reason during the running of hardware/software of the computer system, or may also be caused by a malicious code, or may also be caused by some unknown reasons. However, this way of managing a certain operation can only achieve the purpose of "limited management", that is, only partial management of the computer system is achieved, rather than the complete management of the computer system.

A computer system security detecting system, a computer system security management system and an active defense system in the existing technology have the following disadvantages: 1. only monitoring a certain function or a certain operation of the computer and only simply judging whether an operation is allowed to occur. 2. This monitoring belongs to result monitoring and cannot monitor the process. 3. This monitoring and management is "post-event", i.e. the process can only be judged according to the results. The main reason is that the current technology still cannot describe the running state of the computer, and thus cannot achieve accurate control on the running state of the computer. In order to achieve the purpose of completely managing and controlling the computer system, it is necessary to manage each current operation of the computer system and analyze the reason leading to the current operation, only when the reason leading to the current operation is fully analyzed, can the correctness of the current operation be judged accurately, so as to realize effective management on the computer system and achieve the purpose of completely managing and controlling the computer system.

In view of complexity of the computer system, when the computer system is running, the reason causing the operation of the computer at a certain time is extremely complex due to the following factors: time, operating requirements of an operator, hardware running requirements, network operation requests, code built-in requirements, etc. To analyze the whole running process of the computer, it is necessary to establish a data structure capable of describing the running state of the computer.

Because the state of the computer in the running process is transient, the state of the computer changes very rapidly in the running process of the computer, and till now, there is no logical structure capable of describing the running state of the computer, which can be used to effectively manage the computer system.

SUMMARY OF THE DISCLOSURE

The present disclosure provides a method for constructing a data structure for describing execution process of computer codes, constructing a data structure using this method and describing running state and running state transition of a computer using this data structure.

In an embodiment of the present disclosure, a method for constructing a data structure for describing execution process of computer codes is provided, the method including:

constructing a data structure by using a code segment in which a calling instruction is located as a node and using a calling relationship which is built by the calling instruction between a code segment initiating the calling instruction and a called code segment as a calling path when a computer is running, the data structure includes respective nodes and calling paths between respective calling nodes and respective called nodes.

Optionally, the constructing a data structure includes:

acquiring a calling instruction;

acquiring a code segment initiating the calling instruction and a called code segment;

constructing nodes by using the acquired code segment initiating the calling instruction and the acquired called code segment; and constructing a calling relationship between the code segment initiating the calling instruction and the called code segment.

Optionally, the acquiring a calling instruction includes:

performing binary translation on machine codes executed by the computer, so as to acquire the calling instruction.

Optionally, the acquiring a code segment initiating the calling instruction and a called code segment includes:

acquiring an address of the called code segment from calling parameters; and acquiring the called code segment based on the address of the called code segment, the code segment in which the calling instruction is located being the code segment initiating the calling instruction.

Compared with the prior art, the disclosure has the following advantages:

When the computer is running, the disclosure establishes a data structure by using the code segment in which the calling instruction is located as a node and using the calling relationship between the code segment initiating the calling instruction and the called code segment as a calling path. Through the data structure, it can be figured out the party that initiates the calling instruction (initiator) and the party toward which the calling instruction is initiated (called target), thus the running state of the computer can be known.

An embodiment of the present disclosure also provides a method for describing running state of a computer by using the above data structure, including:

describing the running state of the computer when a calling instruction is executed by using a data structure including all nodes and calling paths prior to the calling instruction, when the calling instruction is executed.

Optionally, the method for describing running state of the computer by using the above data structure further includes:

acquiring a data structure including all nodes and calling paths prior to the calling instruction when the calling instruction is executed.

Compared with the prior art, the disclosure has the following advantages:

According to the above-established data structure, when a calling instruction is executed, if there exists a requirement to acquire the current running state of the computer, the running state of the computer can be described by using the data structure including all nodes and calling paths prior to the calling instruction, thereby the running state of the computer at a certain time can be known. In this way, the running efficiency of the computer can be evaluated according to the running state of the computer, and can be adjusted according to the evaluation result of the running efficiency, thus improving the running efficiency of the computer; furthermore, the running state of the computer can be monitored in whole, which facilitates evaluating hardware and software.

An embodiment of the present disclosure also provides a method for describing running state transition of a computer by using the above data structure, including:

describing the current running state of the computer by using a data structure including all nodes and calling paths prior to the current calling instruction when the current calling instruction is executed; and using the called code segment of the current calling instruction as a new node and using a calling relationship which is built by the calling instruction between a code segment initiating the calling instruction and the called code segment as a new calling path, with a data structure including the new node, the new calling path as well as all nodes and calling paths under the current running state of the computer being the next running state of the computer; and describing a state transition of the computer from the current running state to the next running state using a process of generating the new node and the new calling path.

Optionally, the method for describing transition of running state of a computer by using the above data structure further includes:

acquiring the data structure including all nodes and calling paths prior to the current calling instruction when the current calling instruction is executed.

Optionally, the using the called code segment of the current calling instruction as a new node and using a calling relationship which is built by the calling instruction between a code segment initiating the calling instruction and the called code segment as a new calling path includes:

acquiring the current calling instruction;

acquiring the called code segment of the current calling instruction;

using the called code segment of the current calling instruction as a new node;

constructing a calling relationship between a code segment initiating the calling instruction and the called code segment; and constructing a new calling path using the established calling relationship.

Optionally, the acquiring the current calling instruction includes:

performing binary translation on machine codes executed by the computer, so as to acquire the current calling instruction.

Optionally, the acquiring the called code segment of the current calling instruction includes:

acquiring an address of the called code segment of the current calling instruction from calling parameters; and acquiring the called code segment of the current calling instruction based on the address of the called code segment of the current calling instruction.

Compared with the prior art, the disclosure has the following advantages:

By the method for describing transition of running state of a computer according to the disclosure, how the computer migrates from the current running state to the next running state can be known, that is, the association between the current running state and the next running state can be known. On the basis of the acknowledge of the transition of the running state of the computer, the running efficiency of the computer can be evaluated and adjusted, thus improving the running efficiency of the computer; furthermore, the running state of the computer can be monitored in whole, which facilitates evaluating software and hardware.

DETAILED DESCRIPTION OF THE DISCLOSURE

In the method for constructing a data structure for describing execution process of computer codes according to the disclosure, when the computer is running, a data structure is established by using a code segment in which a calling instruction is located as a node and using a calling relationship between a code segment initiating the calling instruction and the called code segment as a calling path, the data structure includes respective nodes and calling paths between respective calling nodes and called nodes. In this way, it can be figured out the party (initiator) that initiates the calling instruction and the party (called target) toward which the calling instruction is initiated.

In order to make those skilled in the art better understand the spirit of the disclosure, the method for constructing a data structure for describing execution process of computer codes according to the disclosure will be illustrated in detail hereinafter in conjunction with drawings and specific embodiments.

The computer achieves a certain function by executing codes and performing calling between functions, a segment of codes executed sequentially is defined as "code segment", after a code segment is executed sequentially, it jumps to the next code segment through a calling instruction, based on this principle, the disclosure establishes a data structure for describing the execution process of computer code.

In the method for constructing a data structure for describing execution process of computer codes according to the disclosure, when the computer is running, a data structure is established by using a code segment in which the calling instruction is located as a node and using a calling relationship which is built by the calling instruction between a code segment initiating the calling instruction and the called code segment as a calling path, the data structure includes nodes and calling paths between respective calling nodes and called nodes. The calling node refers to a node established by the code segment initiating the calling instruction, the called node refers to a node established by a code segment which is called by the calling instruction (i.e. the called code segment), that is, in the process of constructing two sequentially adjacent nodes, the calling node refers to a node which is established firstly, and the called node refers to a node which is established later.

Figure 1:
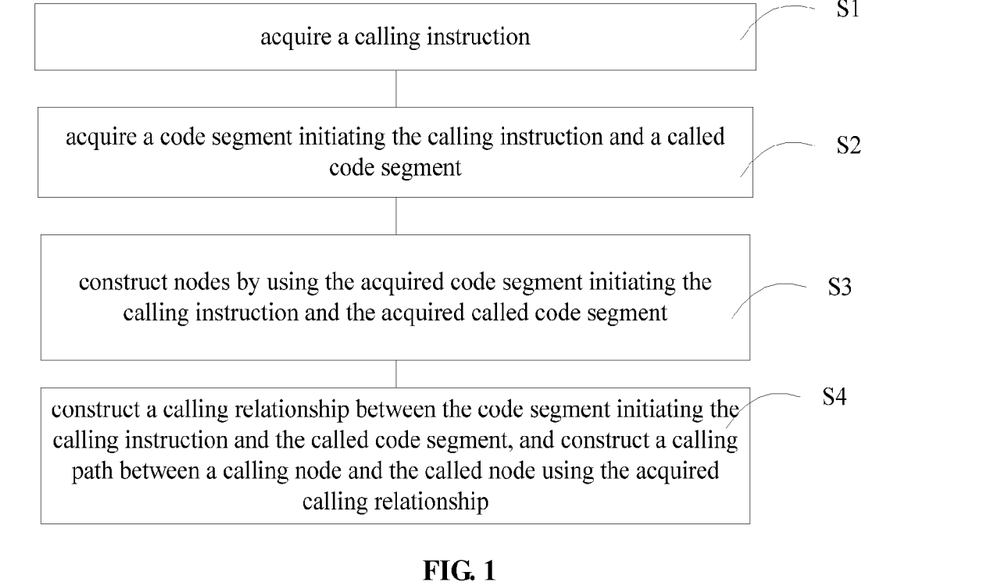
FIG. 1 is a flowchart of a method for constructing a data structure for describing execution process of computer codes according to a specific embodiment of the disclosure.

FIG. 1 is a flowchart of a method for constructing a data structure for describing execution process of computer codes according to a specific embodiment of the disclosure. Referring to FIG. 1, the method for constructing a data structure for describing execution process of computer codes according to the specific embodiment of the disclosure includes:

Step S1, acquiring a calling instruction;

Step S2, acquiring a code segment initiating the calling instruction and the called code segment;

Step S3, constructing nodes by using the acquired code segment initiating the calling instruction and the acquired called code segment; and Step S4, constructing a calling relationship between the code segment initiating the calling instruction and the called code segment, and using the established calling relationship as a calling path between the calling node and the called node.

The specific embodiment of the disclosure is described in detail hereinafter. Step S1 is performed as: acquiring a calling instruction. The computer codes are divided into multiple code segments by calling instructions, each code segment is a segment of codes executed sequentially, and the codes of the last line of each code segment represent a calling instruction. In the specific embodiment of the disclosure, the calling instruction is an assembly instruction, and the codes executed by the computer are machine codes. In the specific embodiment of the disclosure, the acquiring a calling instruction includes: performing a binary translation on machine codes executed by the computer, so as to acquire the calling instruction. Specifically, the machine codes are translated into assembly codes by performing binary translation on the machine codes executed by the computer, this process is a disassembling process, and after the machine codes are converted into codes in assembly language, the calling instruction can be acquired from the codes in assembly language.

Figure 2:
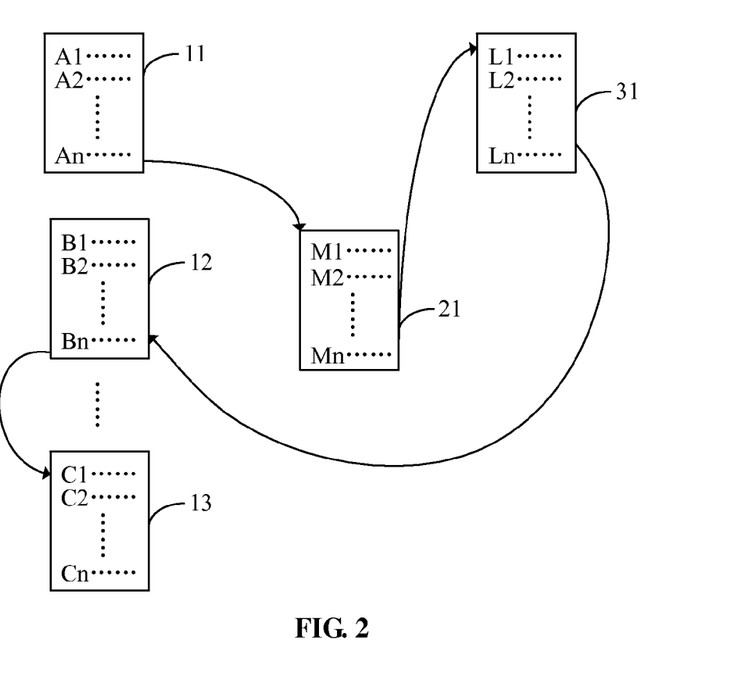
FIG. 2 is a schematic view showing a calling relationship between code segments according to a specific embodiment of the disclosure.

FIG. 2 is a schematic view showing calling relationships between code segments according to a specific embodiment of the disclosure. Referring to FIG. 2, FIG. 2 shows multiple code segments which are respectively a code segment 11 composed of codes of lines A1~An, a code segment 12 composed of codes of lines B1~Bn, a code segment 13 composed of codes of lines C1~Cn, a code segment 21 composed of codes of lines M1~Mn and a code segment 31 composed of codes of lines L1~Ln, the codes of line An, the codes of line Bn, the codes of line Cn, the codes of line Mn and the codes of line Ln are calling instructions, and the computer codes in FIG. 2 are divided into multiple code segments (i.e. a code segment 11, a code segment 12, a code segment 13, a code segment 21 and a code segment 31) by the codes of line An, the codes of line Bn, the codes of line Cn, the codes of line Mn and the codes of line Ln. In the specific embodiment of the disclosure shown in FIG. 2, after the code segment 11 is executed by the computer, the code segment 21 is called by the codes of line An; after the code segment 21 is executed, the code segment 31 is called by the codes of line Mn; after the code segment 31 is executed, the code segment 12 is called by the codes of line Ln; and after the code segment 12 is executed, the code segment 13 is called by the codes of line Bn. The figure just schematically gives an example of several code segments to help those skilled in the art better understand the disclosure.

In the specific embodiment of the disclosure, codes of line An, codes of line Bn, codes of line Cn, codes of line Mn and codes of line Ln are machine codes, and calling instructions in assembly language can be obtained by performing binary translation on them.

Step S2 is performed as: acquiring a code segment initiating the calling instruction and a called code segment. Taking FIG. 2 as an example for illustration, after the step S1 is performed to acquire a calling instruction, the computer codes are divided into multiple code segments by the acquired calling instructions, which are respectively a code segment 11, a code segment 12, a code segment 13, a code segment 21 and a code segment 31. For example, if the calling instruction acquired in step S1 is the calling instruction represented by the codes of line An, the code segment 11 initiating the calling instruction and the called code segment 21 are acquired in step S2. If the calling instruction acquired in step S1 is the calling instruction represented by the codes of line Mn, the code segment 21 initiating the calling instruction and the called code segment 31 are acquired in step S2.

Figure 3:
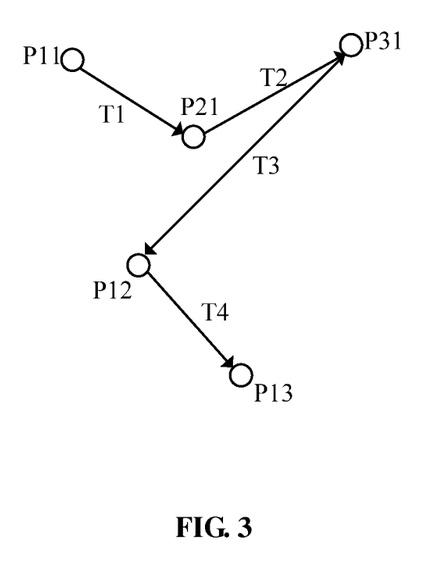
FIG. 3 is a schematic view showing a data structure established in a specific embodiment of the disclosure.

Step S3 is performed: constructing nodes by using the acquired code segment initiating the calling instruction and the acquired called code segment. Referring to FIG. 2 and FIG. 3 for illustration, a node P11 is established using the code segment 11; then, the calling instruction represented by the codes of line An calls the code segment 21, and a node P21 is established using the code segment 21; then, the calling instruction represented by the codes of line Mn calls the code segment 31, and a node P31 is established using the code segment 31; then, the calling instruction represented by the codes of line Ln calls the code segment 12, and a node P12 is established using the code segment 12; then, the calling instruction represented by the codes of line Bn calls the code segment 13, and a node P13 is established using the code segment 13.

Step S4 is performed as: constructing a calling relationship between the code segment initiating the calling instruction and the called code segment and using the established calling relationship as a calling path between the calling node and the called node. Referring to FIG. 2 and FIG. 3 again for illustration, a calling path T1 between the node of the code segment 11 and the node of the code segment 21 is established using the calling relationship from the code segment 11 (the initiator of the calling instruction corresponding to the codes of line An) to the code segment 21 (the called target of the calling instruction corresponding to the codes of line An, and the initiator of the calling instruction corresponding to the codes of line Mn), a calling path T2 between the node of the code segment 21 and the node of the code segment 31 is established using the calling relationship from the code segment 21 to the code segment 31, a calling path T3 between the node of the code segment 31 and the node of the code segment 12 is established using the calling relationship from the code segment 31 to the code segment 12, and a calling path T4 between the node of the code segment 12 and the node of the code segment 13 is established using the calling relationship from the code segment 12 to the code segment 13, thereby constructing calling paths between all nodes from a root node to the current node.

Based on such manner, every time a code segment is executed, i.e. every time a calling instruction is executed, a node is established by using the code segment initiating the calling instruction, thereby all nodes from the root node to the current node being established. The calling node and the called node are linked using the established calling path, and the root node refers to the initial initiator of the current node, i.e. the origin of the current node, that is, the root node can reach the current node via a series of calling paths and several nodes in the calling paths. In the example in FIG. 2, assuming that the code segment 13 is the current code segment, the calling instruction represented by the codes of line Cn of the code segment 13 is the current calling instruction; the code segment 11 is the initial initiator of the current calling instruction, the code segment 11 is the root node, the code segment 13 is the current node, the code segment 21, the code segment 31 and the code segment 12 are nodes between the root node and the current code. Referring to FIG. 3, the node P11 is the root node, the node P13 is the current node, and the nodes P21, P31 and P12 are nodes between the root node and the current node.

It should be noted that the method for constructing a data structure for describing execution process of computer codes according to the disclosure is a dynamic process, every time a calling instruction is acquired, the code segment initiating the calling instruction and the called code segment are acquired, then nodes are established by using the acquired code segment initiating the calling instruction and the acquired called code segment, and the calling path between the calling node and the called node is established using the calling relationship between the code segment initiating the calling instruction and the called code segment. In this way, a data structure which continuously describes the execution process of the computer codes can be established.

Existing computers are stack type computers, the stack region is allocated and released automatically by a compiler and is used to store calling parameters of the calling instructions. The calling parameters include the address of the next code segment (i.e. the called code segment) called by the calling instruction, and the operation method and operation content of the next code segment, the operation method refers to how to complete an operation, the operation content refers to the object of the operation, for example, assuming that the next code segment is used for deleting a file, then the operation method is "deleting", and the operation content is the file.

The acquiring the code segment initiating the calling instruction and the called code segment includes: acquiring the address of the called code segment from the calling parameters, such as the address of the codes in the first line of the called code segment, taking FIG. 2 as an example, if the called code segment is the code segment 21, the acquired address of the called code segment is the address of the codes in the line M1, i.e. the address of the codes in the first line of the code segment 21; and acquiring the called code segment based on the address of the called code segment, with the code segment in which the calling instruction is located being the code segment initiating the calling instruction.

Based on the data structure for describing execution process of computer codes established by using the above method, the disclosure also provides a method for describing running state of a computer, when a calling instruction is executed, the running state of the computer when the calling instruction is executed is described by using the data structure including all nodes and calling paths prior to the calling instruction. Specifically, when a calling instruction is executed, the data structure including all nodes and calling paths prior to the calling instruction is acquired. When the current running state of the computer is to be obtained, the current running state of the computer can be described by using the data structure including all nodes and calling paths prior to the calling instruction. By describing the running state of the computer in this way, the running state of the computer is not an isolated current-time running state, but an associated running state containing running information of the previous time periods. Still taking the specific embodiment shown in FIG. 2 as an example and referring to FIG. 3 for illustration, if the calling instruction represented by the codes of line Bn is executed, then at this time, the running state of the computer is a data structure including the node P11 represented by the code segment 11, the node P21 represented by the code segment 21, the node P31 represented by the code segment 31, the node P12 represented by the code segment 12, the calling path T1 from the code segment 11 to the code segment 21 (i.e. the calling path T1 between the node P11 and the node P21), the calling path T2 from the code segment 21 to the code segment 31 (i.e. the calling path T2 between the node P21 and the node P31), the calling path T3 from the code segment 31 to the code segment 12 (i.e. the calling path T3 between the node P31 and the node P12). If illustration is made from the data structure shown in FIG. 3, the data structure is a data structure including nodes P11, P21, P13, P12 and calling paths T1, T2, T3 between respective nodes, the data structure describes the running state of the computer when the calling instruction represented by the codes of line Bn is executed.

After the running state of the computer is known, the running efficiency of the computer can be evaluated according to the running state of the computer, and the running efficiency of the computer can be adjusted according to the evaluation result of the running efficiency of the computer, thus improving the running efficiency of the computer; furthermore, the running state of the computer can be monitored in whole, which facilitates evaluating software and hardware.

According to the data structure established using the above method, the disclosure also provides a method for describing transition of running states of a computer, in which the term "transition" in the disclosure refers to the state transform of the computer from one running state to the next running state.

The method for describing transition of running state of a computer according to a specific embodiment of the disclosure includes:

A first step: describing the current running state of the computer by using a data structure including all nodes and calling paths prior to the current calling instruction when the current calling instruction is executed;

A second step: using the called code segment of the current calling instruction as a new node and using a calling relationship which is built by the calling instruction between a code segment initiating the current calling instruction and the called code segment as a new calling path, with a data structure including the new node, the new calling path as well as all nodes and calling paths under the current running state of the computer being the next running state of the computer; and Describing a state transition of the computer from the current running state to the next running state by using the process of constructing the new node and the new calling path, that is, the process for constructing the new node and the new calling path in step S2 is the state transition of the computer from the current running state to the next running state.

In practical applications, more attention is paid to the transition of the running state of the computer, i.e. the transform process of the computer from the current running state to the next running state, therefore, in the disclosure, the transition of the running state of the computer is described based on the established data structure. In the disclosure, the first step is performed according to the above established data structure: describing the current running state of the computer by using the data structure including all nodes and calling paths prior to the current calling instruction, specifically, i.e. when the current calling instruction is executed, acquiring the data structure including all nodes and calling paths prior to the current calling instruction and describing the current running state of the computer by using the data structure. Since the running state of the computer is described in this way, the running state of the computer is not an isolated current-time running state, but an associated running state containing running information of the previous time periods.

When the computer runs from the current running state to the next running state, which means that the next code segment is called by the current calling instruction, the state transition of the computer from the current running state to the next running state can be described based on this principle. The second step is performed as: using the called code segment of the current calling instruction as a new node and using a calling relationship which is built by the calling instruction between a code segment initiating the current calling instruction and the called code segment as a new calling path, with a data structure including the new node, the new calling path as well as all nodes and calling paths under the current running state of the computer being the next running state of the computer.

In a specific embodiment of the disclosure, the constructing a new node and a new calling path includes: acquiring the current calling instruction; acquiring the called code segment of the current calling instruction; using the called code segment of the current calling instruction as a new node; constructing a calling relationship between the code segment initiating the calling instruction and the called code segment; and constructing a new calling path using the established calling relationship.

In a specific embodiment of the disclosure, the acquiring the current calling instruction includes: performing binary translation on machine codes executed by the computer so as to acquire the current calling instruction. The acquiring the called code segment of the current calling instruction includes: acquiring an address of the called code segment of the current calling instruction from calling parameters, i.e. the address of the codes in the first line of the called code segment; and acquiring the called code segment of the current calling instruction based on the address of the called code segment of the current calling instruction.

It should be noted that in the method for describing transition of running state of a computer, the specific steps for acquiring the current calling instruction and constructing the new calling path and the new node can refer to the detailed description in the disclosure for constructing the data structure, the teaching of which can make those skilled in the art understand how to acquire the current calling instruction and establish the new calling path and the new node.

An example is illustrated in conjunction with FIG. 2 and FIG. 3, if the current calling instruction is the calling instruction represented by the codes of line Bn, the running state of the computer is a data structure including a node P11 represented by the code segment 11, the node P21 represented by the code segment 21, the node P31 represented by the code segment 31, the node P12 represented by the code segment 12, the calling path T1 from the code segment 11 to the code segment 21 (i.e. the calling path T1 between the node P11 and the node P21), the calling path T2 from the code segment 21 to the code segment 31 (i.e. the calling path T2 between the node P21 and the node P31), the calling path T3 from the code segment 31 to the code segment 12 (i.e. the calling path T3 between the node P31 and the node P12), as illustrated from the data structure shown in FIG. 3, the data structure is a data structure including nodes P11, P21, P13, P12 and calling paths T1, T2, T3 between respective nodes, which describes the current running state of the computer.

When a calling instruction represented by the codes of line Bn calls the code segment 13, the code segment 13 is a new node P13, a new calling path T4 is established using the calling relationship from the code segment 12 to the code segment 13 which is built by the calling instruction represented by the codes of line Bn; the node P13 and the calling path P14 as well as nodes P11, P21, P31, P12 and calling paths T1, T2, T3 between respective nodes collectively constitute the next running state of the computer. The process of forming the new node P13 and the new calling path T4 is the state transition of the computer system from the current running state to the next running state.

By the method for describing transition of running state of a computer according to the disclosure, how the computer migrates from one running state to the next running state can be known, and the running of the computer is a continuous process, and in this way, based on the method of the disclosure and the acknowledge of the transition of the running state of the computer, the running efficiency of the computer can be evaluated and adjusted, thus improving the running efficiency of the computer; the running state of the computer can be monitored in whole, which facilitates evaluating software and hardware; and code correlation analysis can be performed according to the associated relation between the code segments.

The above are only specific embodiments of the disclosure which are used to make those skilled in the art better understand the spirit of the disclosure, however, the scope of protection of the disclosure should not be limited to the specific descriptions of the specific embodiments, various modifications can be made to the specific embodiments of the disclosure by those skilled in the art without departing from the scope of spirit of the disclosure.

What is claimed is:

1. A method for constructing a data structure for describing a current running state of a whole computer at a current time, the method comprising:
   in response to a calling instruction being called, which is acquired after performing a disassembling process that translates machine codes into assembly codes, constructing, at a current time of execution of the calling instruction, the data structure for describing the current running state of the whole computer at the current time at least by:
   using a code segment in which the calling instruction is located as a node;
   using a calling relationship which is built by the calling instruction between a code segment initiating the calling instruction and a called code segment as a calling path when the computer is running; and
   using one or more nodes and calling paths prior to the calling instruction as part of the data structure, wherein:
      the code segment comprises a segment of codes executed sequentially by the computer, which jumps to the called code segment according to the calling instruction, the code segment in which the calling instruction is located is referred to as a calling node, the called code segment is referred to as a called node, and the data structure comprises respective nodes and calling paths between respective calling nodes and respective called nodes;

each time a new calling instruction that is executed by the computer is acquired, the data structure is acquired, where the data structure comprises all nodes and corresponding calling paths prior to the new calling instruction, and dynamically update the data structure by:

acquiring an address of the new called code segment from calling parameters;

acquiring a code segment initiating the new calling instruction based on the address of the new called code segment and acquiring a called code segment called by the new calling instruction;

using the code segment initiating the new calling instruction as a new calling node;

using the called code segment called by the new calling instruction as a new called node;

establishing a new calling path between the new calling node and the new called node using a calling relationship between the code segment initiating the new calling instruction and the called code segment; and adding the new calling node, the new called node, and the new calling path into the data structure so that the data structure is updated continuously in real time.

2. The method for constructing the data structure for describing the current running state of the whole computer at the current time according to claim 1, wherein acquiring the calling instruction comprises:

performing binary translation on machine codes executed by the computer, so as to acquire the calling instruction.

3. A method for describing a current running state of a whole computer at a current time by using a data structure, the method comprising:

in response to a calling instruction being called, which is acquired after performing a disassembling process that translates machine codes into assembly codes, constructing, at a current time of execution of the calling instruction, the data structure for describing the current running state of the whole computer at the current time at least by:

using a code segment in which the calling instruction is located as a node;

using a calling relationship which is built by the calling instruction between a code segment initiating the calling instruction and a called code segment as a calling path when the computer is running; and using one or more nodes and calling paths prior to the calling instruction as part of the data structure, wherein:

the code segment comprises a segment of codes executed sequentially by the computer, which jumps to the called code segment according to the calling instruction, the code segment in which the calling instruction is located is referred to as a calling node, the called code segment is referred to as a called node, and the data structure comprises respective nodes and calling paths between respective calling nodes and respective called nodes;

each time a new calling instruction that is executed by the computer is acquired, the data structure is acquired, where the data structure comprises all nodes and corresponding calling paths prior to the new calling instruction, and the data structure is dynamically updated by:

acquiring an address of the new called code segment from calling parameters;

acquiring a code segment initiating the new calling instruction based on the address of the new called code segment and acquiring a called code segment called by the new calling instruction;

using the called code segment called by the new calling instruction as a new called node;

establishing a new calling path between the new calling node and the new called node is established using a calling relationship between the code segment initiating the new calling instruction and the called code segment; and adding the new calling node, the new called node, and the new calling path into the data structure so that the data structure is updated continuously in real time.

4. The method for describing the current running state of the whole computer at the current time according to claim 3, wherein acquiring the calling instruction comprises:

performing binary translation on machine codes executed by the computer, so as to acquire the calling instruction.

5. A method for describing a current running state transition of a whole computer at a current time by using a data structure, the method comprising:

in response to a calling instruction being called, which is acquired after performing a disassembling process that translates machine codes into assembly codes, constructing, at a current time of execution of a calling instruction, the data structure for describing the current running state of the whole computer at the current time at least by:

using a code segment in which the calling instruction is located as a node;

using a calling relationship which is built by the calling instruction between a code segment initiating the calling instruction and a called code segment as a calling path when the whole computer is running; and using one or more nodes and calling paths prior to the calling instruction as part of the data structure, wherein:

the code segment comprises a segment of codes executed sequentially by the computer, which jumps to the called code segment according to the calling instruction, the code segment in which the calling instruction is located is referred to as a calling node, the called code segment is referred to as a called node, and the data structure comprises respective nodes and calling paths between respective calling nodes and respective called nodes;

each time a new calling instruction that is executed by the computer is acquired, the data structure is acquired, where the data structure comprises all nodes and corresponding calling paths prior to the new calling instruction, and dynamically update the structure by:

acquiring an address of the new called code segment from calling parameters;

acquiring a code segment initiating the new calling instruction based on the address of the new called code segment and acquiring a called code segment called by the new calling instruction;

using the called code segment called by the new calling instruction as a new called node;

establishing a new calling path between the new calling node and the new called node using a calling relationship between the code segment initiating the new calling instruction and the called code segment; and adding the new calling node, the new called node, and the new calling path into the data structure so that the data structure is updated continuously in real time.

6. The method for describing the current running state transition of the whole computer at the current time according to claim 5, wherein acquiring the current calling instruction comprises:

performing binary translation on machine codes executed by the computer, so as to acquire the calling instruction.

* * * * *